US012002235B2

(12) United States Patent
Thong et al.

(10) Patent No.: US 12,002,235 B2
(45) Date of Patent: Jun. 4, 2024

(54) APPARATUS AND METHOD FOR ESTIMATING CAMERA ORIENTATION RELATIVE TO GROUND SURFACE

(71) Applicant: Hong Kong Applied Science and Technology Research Institute Company Limited, Hong Kong (HK)

(72) Inventors: Wang Kit Wilson Thong, Hong Kong (HK); Jihui Zhang, Hong Kong (HK); Man Wai Kwan, Hong Kong (HK); Yiu Man Lam, Hong Kong (HK); Cheng Hsiung Liu, Hong Kong (HK); Jiaxin Yan, Hong Kong (HK); Zhuobin Lin, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 662 days.

(21) Appl. No.: 17/197,069

(22) Filed: Mar. 10, 2021

(65) Prior Publication Data

US 2022/0051430 A1  Feb. 17, 2022

Related U.S. Application Data

(63) Continuation-in-part of application No. 16/992,088, filed on Aug. 12, 2020, now Pat. No. 11,348,277.

(51) Int. Cl.
*G06T 7/73* (2017.01)
*G05D 1/00* (2006.01)
(Continued)

(52) U.S. Cl.
CPC .............. *G06T 7/73* (2017.01); *G05D 1/0011* (2013.01); *G05D 1/0088* (2013.01);
(Continued)

(58) Field of Classification Search
CPC .... G06T 7/13; G06T 7/60; G06T 7/70; G06T 7/73; G06T 2207/30244;
(Continued)

(56) References Cited

U.S. PATENT DOCUMENTS 10,499,996 B2    12/2019  de Almeida Barreto
2010/0134634 A1*  6/2010  Witt .................... H04N 5/2224
                                              348/181
(Continued)

FOREIGN PATENT DOCUMENTS

CN    105701790 A    6/2016
CN    109166149 A    1/2019
(Continued)

OTHER PUBLICATIONS

International Search Report of corresponding PCT Patent Application No. PCT/CN2021/080455 mailed on Jun. 23, 2021.
(Continued)

*Primary Examiner* — Andrew W Johns
(74) *Attorney, Agent, or Firm* — Idea Intellectual Limited; Margaret A. Burke; Sam T. Yip

(57) ABSTRACT

An iterative multi-image camera orientation estimation comprising: capturing an image of a scene before the camera; detecting line segments in the scene; computing a maximum likelihood (ML) camera orientation by maximizing a likelihood objective by rotating the camera's X-Y-Z coordinate system such that it is being optimally aligned with the line segments in at least two of the frontal, the lateral, and the vertical orthogonal directions; estimating a maximum a-posteriori (MAP) camera orientation that maximizes an a-posteriori objective such that the MAP camera orientation is an optimal value in between the priori camera orientation and the ML camera orientation, and is closer to the one with smaller uncertainty; iterating the multi-image
(Continued)

camera orientation estimation with the priori camera orientation and its corresponding priori camera orientation uncertainty set to the computed MAP camera orientation and its corresponding uncertainty respectively until the uncertainty is lower than a threshold.

10 Claims, 7 Drawing Sheets

(51) Int. Cl.
    *G06F 17/11*     (2006.01)
    *G06T 7/13*     (2017.01)
    *G06T 7/536*     (2017.01)
    *G06T 7/80*     (2017.01)

(52) U.S. Cl.
CPC ........... *G05D 1/0231* (2013.01); *G06F 17/11* (2013.01); *G06T 7/13* (2017.01); *G06T 7/536* (2017.01); *G06T 7/80* (2017.01); *G06T 2207/10016* (2013.01); *G06T 2207/20061* (2013.01); *G06T 2207/30244* (2013.01); *G06T 2207/30252* (2013.01)

(58) Field of Classification Search
CPC .......... G06T 2207/30252; G06V 20/56; G06V 20/58; G06V 20/582; G06V 20/584; G06V 20/586; G06V 20/588; B60R 1/00; B60R 1/22; B60R 1/23; B60R 1/24; B60R 2300/30
See application file for complete search history.

(56) References Cited

U.S. PATENT DOCUMENTS

| | | |
|---|---|---|
| 2015/0324985 A1 | 11/2015 | Shechtman et al. |
| 2016/0012589 A1 | 1/2016 | Hamer et al. |
| 2019/0250705 A1 | 8/2019 | Zhang et al. |
| 2020/0151865 A1 | 5/2020 | Sota et al. |
| 2020/0250852 A1 | 8/2020 | Wei et al. |
| 2021/0241492 A1* | 8/2021 | Hsu et al. ................. G06T 7/13 |

FOREIGN PATENT DOCUMENTS

| | | |
|---|---|---|
| CN | 110930365 A | 3/2020 |
| CN | 110930459 A | 3/2020 |
| EP | 2912631 B1 | 2/2020 |

OTHER PUBLICATIONS

Richard Hartley et al., "Multiple View Geometry in Computer Vision". Cambridge university press, 2003.
S. Sumikura et al., "OpenVSLAM: A Versatile Visual SLAM Framework", Proceedings of the 27th ACM International Conference on Multimedia, Oct. 2019, pp. 2292-2295.
Faraz M. Mirzaei et al., "Optimal Estimation of Vanishing Points in a Manhattan World", 2011 International Conference on Computer Vision, IEEE, Nov. 2011, pp. 2454-2461.
Stella X. Yu et al., "Inferring Spatial Layout from A Single Image via Depth-Ordered Grouping", 2008 IEEE Computer Society Conference on Computer Vision and Pattern Recognition Workshops, IEEE, Jun. 2008, pp. 1-7.
Timothy Barfoot et al., "Pose Estimation using Linearized Rotations and Quaternion Algebra", Acta Astronautica, 68 (1-2), 2011, pp. 101-112.
Stan Birchfield, "An Introduction to Projective Geometry (for computer vision)", Stanford university, Mar. 12, 1998.
A. H. De Ruiter, "Quadratically Constrained Least Squares with Aerospace Applications", Journal of Guidance, Control, and Dynamics, 39(3), 2016, pp. 487-497.
Canny Edge Detection, http://fourier.eng.hmc.edu/e161/lectures/canny/node1.html (dated Aug. 13, 2020).
Statistical Hough Transform, https://docs.opencv.org/3.4/dd/d1a/group_imgproc_feature.html#ga8618180a5948286384e3b7ca02f6feeb, (dated Aug. 20, 2020).
Camera calibration, https://docs.opencv.org/master/dc/dbb/tutorial_py_calibration.html (dated Aug. 13, 2020).
Camera matrix, http://www.cs.cmu.edu/~16385/s17/Slides/11.1_Camera_matrix.pdf (date unknown).
Christopher M. Bishop, "Pattern recognition and machine learning", springer, 2006.
X. Lu et al., "2-Line Exhaustive Searching for Real-Time Vanishing Point Estimation in Manhattan World", 2017 IEEE Winter Conference on Applications of Computer Vision (WACV), IEEE, Mar. 2017, pp. 345-353.

* cited by examiner

APPARATUS AND METHOD FOR ESTIMATING CAMERA ORIENTATION RELATIVE TO GROUND SURFACE

CROSS-REFERENCES TO RELATED APPLICATIONS

This application is a continuation-in-part application of U.S. application Ser. No. 16/992,088, filed on Aug. 12, 2020, the disclosure of which is hereby incorporated by reference in its entirety.

FIELD OF THE INVENTION

The present invention generally relates to the field of estimating camera orientation relative to a ground surface. More specifically, the present invention relates to techniques of estimating camera orientation automatically by analyzing a sense structure through leveraging properties of orthogonal vanishing points.

BACKGROUND OF THE INVENTION

Machine vision has gained much attentions in commercial and industrial use, such as imaging-based analysis for production and logistic automation. In many machine vision-based applications, camera orientation plays an important role; i.e. it is needed in order to obtain real metric units in three-dimensional (3D) space from measurements on two-dimensional (2D) images or video frames. For example, in vehicle guidance, lane departure detection that detects when the vehicle moves away from lane markers on ground requires the knowledge of camera orientation with respect to the ground plane. Camera orientation, in particular its pitch and row angle, can be made known by a manual calibration procedure after it is mounted on the vehicle. However, for a fleet of vehicles, such as a fleet of automatic guided vehicles (AGV) in a factory or warehouse, such repetitive manual calibration on every AGV is troublesome and error prone. Moreover, camera orientation often drifts after extended period of time of use from hard braking, sudden accelerations, inadvertent camera movements, etc.

It is possible to estimated camera orientation from a single image. For example, where vertical structure is clearly visible, its vertical vanishing line gives indication of the camera's orientation relative to the ground. However, in many practical circumstances where there is no vertical structure in the captured image, it is impossible to obtain vertical vanishing points to estimate the ground plane. Accordingly, there is a need in the art of a new approach for estimating camera orientation that can address the shortcomings in the estimation approach that depends on vertical vanishing points.

U.S. application Ser. No. 16/992,088 discloses a method for estimating camera orientation of a front-facing camera from the determination of the ground plane in a captured image of a scene. The method comprises a determination of the ground plane in the image using a virtual rotatable cube superimposed on to the image to best match the virtual cube's orientation with the line segment groups in the image. The ground plane can then be estimated from the orthogonal vanishing points of the virtual cube. However, under certain conditions, this method suffers insufficient precision in the ground plane estimation as the uncertainty in the virtual cube's orientation can be undesirably high and the accuracy in the orthogonal distance measurements in the image inadequate. Therefore, a better technique is needed for high precision machine vision applications.

SUMMARY OF THE INVENTION

The present invention provides a method and an apparatus for estimating camera orientation relative to a ground surface. It is the objective of the present invention to provide such method and apparatus that can achieve high accuracy in the camera orientation estimation. In applications where a camera is being moved around on a flat ground surface, for example, a camera mounted on an AGV or a mobile robot, more accurate ground plane estimation can be obtained by combining the ground plane estimation results from multiple sequential video frames or images, leading to high accuracy in the camera orientation estimation. It is the objective of the present invention to provide such method and apparatus for combining the ground plane estimation results from multiple sequential video frames or images in computations that take into consideration the estimation uncertainty associated with each ground plane estimation result.

In accordance to various embodiments of the present invention, the method includes the process steps as follows. A first image (or a first frame of a video file/data stream) of a scene before a front-facing camera is captured and recorded. A plurality of line segments are detected from the first image. The plurality of 2D line segments are classified and grouped into a first, a second, and a third orthogonal directional line segment groups. And the line segments in the first, second, and third orthogonal directional line segment groups can be regarded as roughly pointing to the frontal direction, the lateral direction, and the vertical direction respectively.

In one embodiment, the classification and grouping of the line segments comprises superimposing on to the first image a first virtual cube having three orthogonal vanishing points in a random or best-guess 3D orientation. An orthogonal direction classifier classifies the line segments of the first image and groups them by comparing the perpendicular distances between each of the three orthogonal vanishing points of the first virtual cube to each of the detected line segments, and determining the group of which the line segment belongs to according to the shortest of the three perpendicular distances.

In another embodiment, the classification and grouping of the line segments comprises projecting the 3D x-axis, y-axis, and z-axis infinity points corresponding to an initial orientation of the camera on to the first image to obtain the respective three 2D orthogonal vanishing points in the X, Y, and Z directions of the scene in the first image. The initial orientation of the camera may be obtained from the camera's calibrated (or intrinsic) matrix, a best guess orientation, a randomly set orientation, or measurements using an orientation sensor.

Then, an orthogonal direction classifier classifies the line segments of the first image and groups them into a frontal line segment group, which contains line segments having the shortest perpendicular distances to the X vanishing point in comparison to the other vanishing points; a lateral line segment group, which contains line segments having the shortest perpendicular distances to the Y vanishing point in comparison to the other vanishing points; and a vertical line segment group, which contains line segments having the shortest perpendicular distances to the Z vanishing point in comparison to the other vanishing points.

Other techniques of classifying and grouping line segments detected in a scene in an image may also be adopted by an ordinarily skilled person in the art without undue experiments. One such technique is described in Xiaohu Lu et al., "2-Line Exhaustive Searching for Real-Time Vanishing Point Estimation in Manhattan World", 2017 IEEE Winter Conference on Applications of Computer Vision (WACV), IEEE, 2017; the content of which is incorporated herein by reference in its entirety.

With the line segments classified and grouped into groups, a maximum a-posteriori (MAP) camera orientation estimation is performed to obtain a MAP camera orientation by considering a priori camera orientation with its corresponding priori camera orientation uncertainty and a maximum likelihood (ML) camera orientation with its corresponding ML camera orientation uncertainty; wherein the ML camera orientation is computed by taking the camera's calibrated matrix and maximizing a likelihood objective by rotating the X-Y-Z coordinate system under the camera orientation such that it is being optimally aligned with the 2D line segments in at least two of the three orthogonal directions.

The MAP camera orientation estimation then maximizes a-posteriori objective such that the MAP camera orientation is computed to equal to an optimal value, which being a value in between the ML camera orientation and the priori camera orientation, and being closer to the one with the smaller uncertainty.

The process steps iterate with a second image (or a second frame of the video file/data stream) of the scene before the front-facing camera captured with the priori camera orientation and its corresponding priori camera orientation uncertainty set to the computed MAP camera orientation and its corresponding MAP camera orientation uncertainty respectively. As to the priori camera orientation and its corresponding priori camera orientation uncertainty used in the MAP camera orientation estimation on the first image, a best guess or random camera orientation and its corresponding camera orientation uncertainty are used.

The iterations of the process steps continue with each subsequent image (or subsequent frame of the video file/data stream) and compute an estimated MAP camera orientation and its corresponding MAP camera orientation uncertainty in each iteration until the MAP camera orientation uncertainty is found to be below a MAP camera orientation uncertainty threshold value. Finally, a ground normal vector of the scene before the camera is computed using the estimated MAP camera orientation corresponding to the MAP camera orientation uncertainty found to be below the MAP camera orientation uncertainty threshold value.

In accordance to an application of the present invention, a method for guiding a self-driven vehicle having a front-facing camera includes executing the method for estimating camera orientation of the front-facing camera in accordance to the various embodiments of the present invention. Motions of the self-driven vehicle is determined based on the estimated camera orientation.

In accordance to another application of the present invention, a remote processing server for estimating camera orientation of a front-facing camera of a machine-vision enabled autonomous guided vehicle (AGV) or mobile robot is provided. The remote processing server is in data communication with the AGV or mobile robot and configured to receive a video file/data stream captured by the front-facing camera, so as to execute a method for estimating front-facing camera's orientation in accordance to the various embodiments of the present invention.

An ordinarily skilled person in the art would appreciate that the embodiments of the present invention can be adapted and applied in various applications and under various conditions besides self-driven vehicles, AGVs, and mobile robots; for example, self- and assisted-vehicle parking systems, personal transportation devices, and various indoor and outdoor domestic, commercial, and industrial robotic systems.

BRIEF DESCRIPTION OF THE DRAWINGS

Embodiments of the invention are described in more details hereinafter with reference to the drawings, in which.

DETAILED DESCRIPTION

In the following description, methods and apparatuses for estimating camera orientation relative to a ground plane by leveraging properties of orthogonal vanishing points, and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In the present disclosure, 2D and 3D spatial geometry, such as points and lines as perceived by machine vision are represented in projective space coordinates. Definitions for mathematical notations in the present disclosure are listed as follows:

A point p in a two-dimensional projective space $\mathbb{P}^2$ is represented as three-vector $\vec{p}=(u, v, k)$, and its coordinate in a two-dimensional Euclidean space $\mathbb{E}^2$ is $$\left(\frac{u}{k}, \frac{v}{k}\right);$$

A line l in $\mathbb{P}^2$ is represented as three-vector $\vec{l}=(a, b, c)$, and its slope and y-intercept in $\mathbb{E}^2$ is respectively $$-\frac{a}{b} \text{ and } -\frac{c}{b};$$

A point p is on a line l in $\mathbb{P}^2$ if and only if $p^\top l = 0$ because $au+bv+ck=0$ which is a line equation;

$a^\top$ represents transpose of a, and $a^\top b$ represents dot product between two vectors a and b.

Projective transformation H in $\mathbb{P}^2$ is a 3×3 matrix. It transforms a point in $\mathbb{P}^2$ from p to p'=Hp.

If H in $\mathbb{P}^2$ transforms point from p to p'=Hp, it transforms line from l to l'=$H^{-\top}$l.

$A^{-\top}$ represents transpose of matrix $A^{-1}$, and $A^{-1}$ represents inverse of matrix A;

A point in three-dimensional $\mathbb{E}^3$ is P=(X, Y, Z). Under a pinhole camera model, an image captured by a pinhole camera is modeled as a point p=KP in two-dimensional $\mathbb{P}^2$, where K is a projective transformation in $\mathbb{P}^2$.

K is also known as camera calibrated (or intrinsic) matrix, and it encodes camera's focal length f and principal point $(p_x, p_y)$ by $$K = \begin{bmatrix} f & 0 & p_x \\ 0 & f & p_y \\ 0 & 0 & 1 \end{bmatrix}$$

such that point P=(X, Y, Z) in $\mathbb{E}^3$ is imaged as point $$p = \left( f\frac{X}{Z} + p_x, f\frac{Y}{Z} + p_y, 1 \right)$$

A camera calibrated matrix K can be found by some manual calibration procedure.

Figure 1:
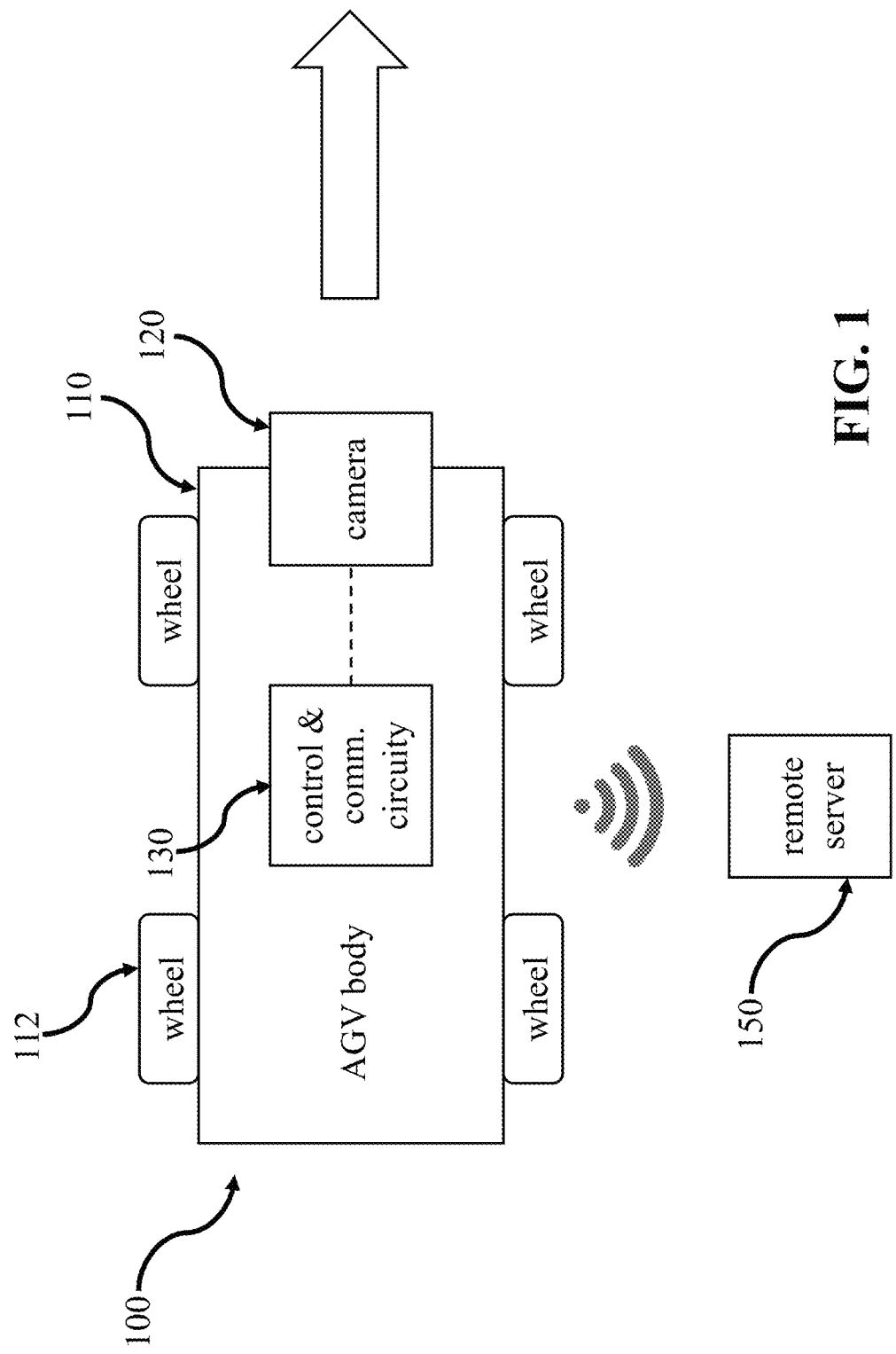
FIG. 1 depicts a schematic diagram of an exemplary embodiment of an autonomous guided vehicle (AGV) in communication with a remote processing server.

Referring to FIG. 1. The AGV 100 includes a vehicle body 110, a front-facing camera 120, and a control and communication circuitries 130 disposed in the body 110. The body 110 has a moving mechanism such as wheels 112 to go forward along arrow. The front-facing camera 120 is installed at the front side of the body 110, so as to capture a scene in front of the AGV 100 and record it into a video file/data stream. The control and communication circuitries 130 are electrically coupled with the front-facing camera 120 and configured to receive the video file/data stream from the front-facing camera 120. The control and communication circuitries 130 are in communication with the remote processing server 150 via a wireless link for uploading the video file/data stream to and downloading instructions from the remote processing server 150. Herein, the instructions include control commands for AGV movements or actions, such as going straight, turning right/left, return to charging station, shutting down, etc. The remote processing server 150 is configured to execute the AGV's machine vision application in processing the video file/data stream. In one embodiment, a group of multiple AGVs 100 is arranged in a factory, warehouse, or distribution center and the remote processing server 150 is responsible to coordinate the group to perform automated large-scope operations such as transporting product parts in a production assembly and routing goods and packages for delivery.

Figure 2:
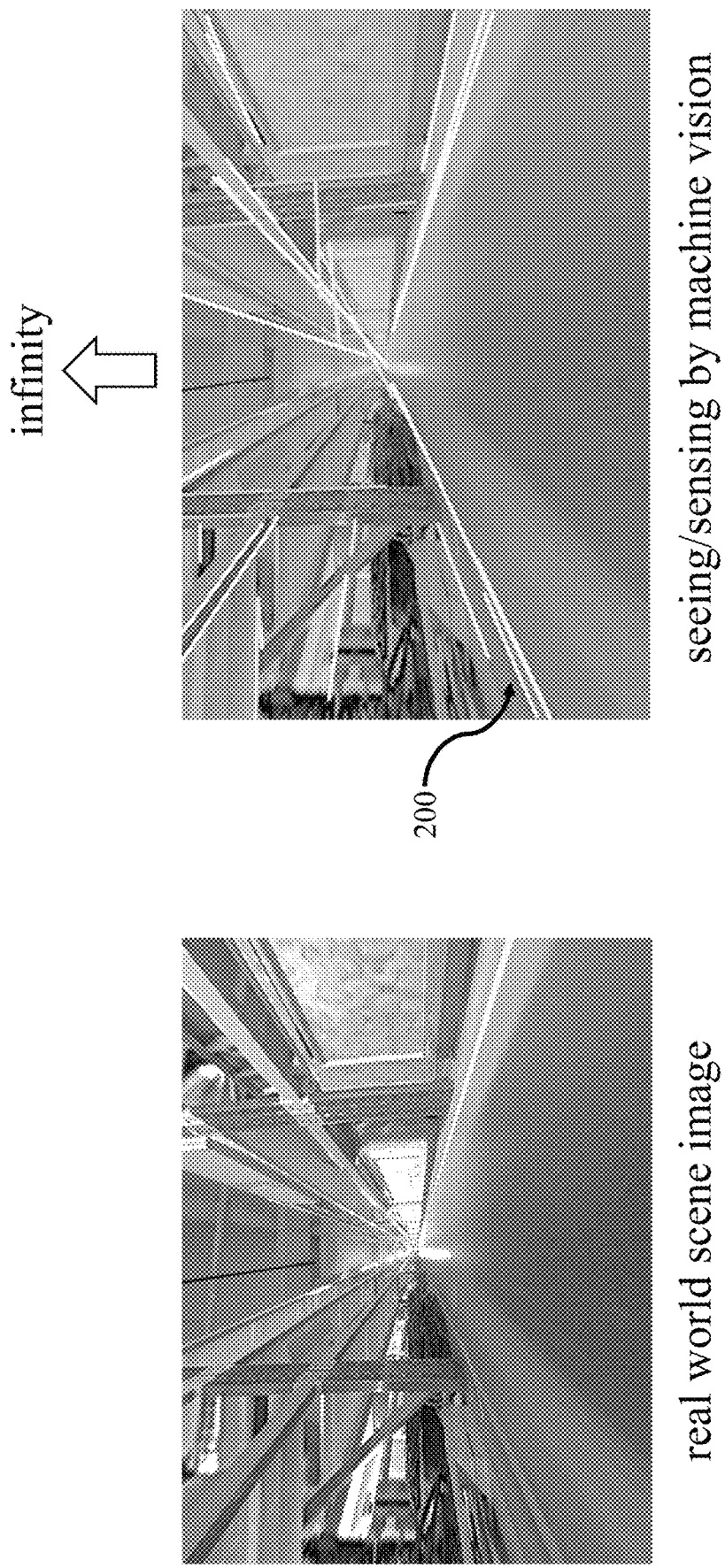
FIG. 2 shows a real-world scene image and what a machine-vision application sees or senses.

In practical cases, during operation of AGVs 100, certain conditions encountered may result in computational problems that cause the AGVs 100 unable to function. For example, as shown in FIG. 2, the left image is a real-world scene image and the right image is what the machine vision application implemented in one of the AGVs 100 sees/senses, and the difference therebetween is that the right one shows line segments 200 detected from the real-world scene image. To estimate camera orientation, either a Z-plane vanishing point (VP) or a ground plane is typically necessary. However, in the right image, a Z-plane VP is very close to infinity because the Z-direction line segments are almost parallel with each other. Under such condition, it is difficult to apply Z-plane VP estimation to the front-facing camera.

Figure 3:
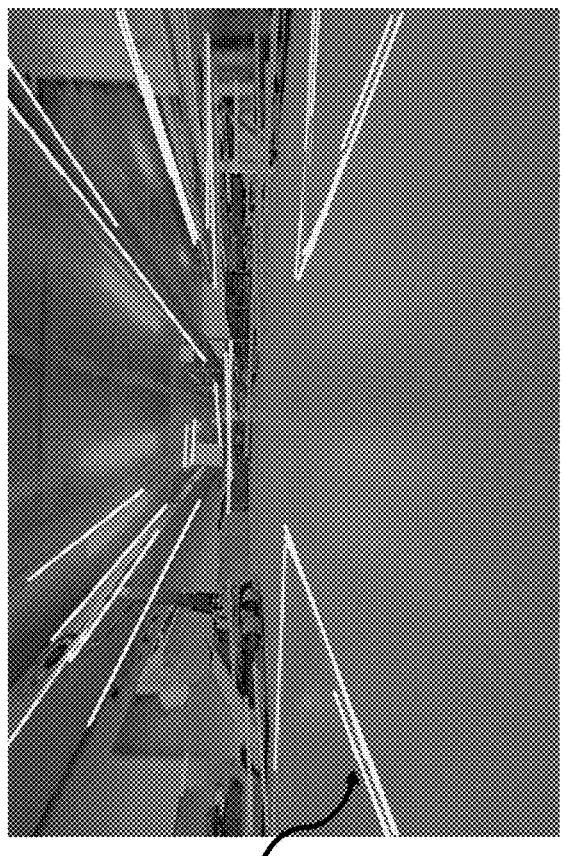
FIG. 3 shows another real-world scene image and what a machine-vision application sees or senses.
Figure 3:
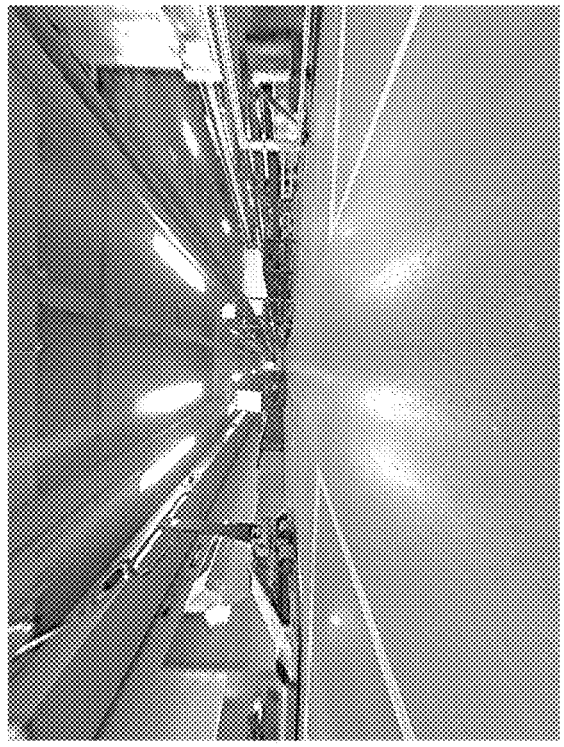

Further, as shown in FIG. 3, the left image is a real-world scene image and the right image is what the machine vision application implemented in one of the AGVs 100 sees/senses, and a difference therebetween is the right one showing line segments 200 detected from the real-world scene image. It is noticed that no Z-direction line segment is detected from the real-world scene image. In this regard, even though a ground plane in the real-world scene image is clearly visible for human sense, the ground plane cannot be estimated by the machine vision application due to no line segment going through a Z-plane VP. That is, it is almost impossible to estimate an object ground plane when there is no vertical structure in the real-world scene image.

Figure 4:
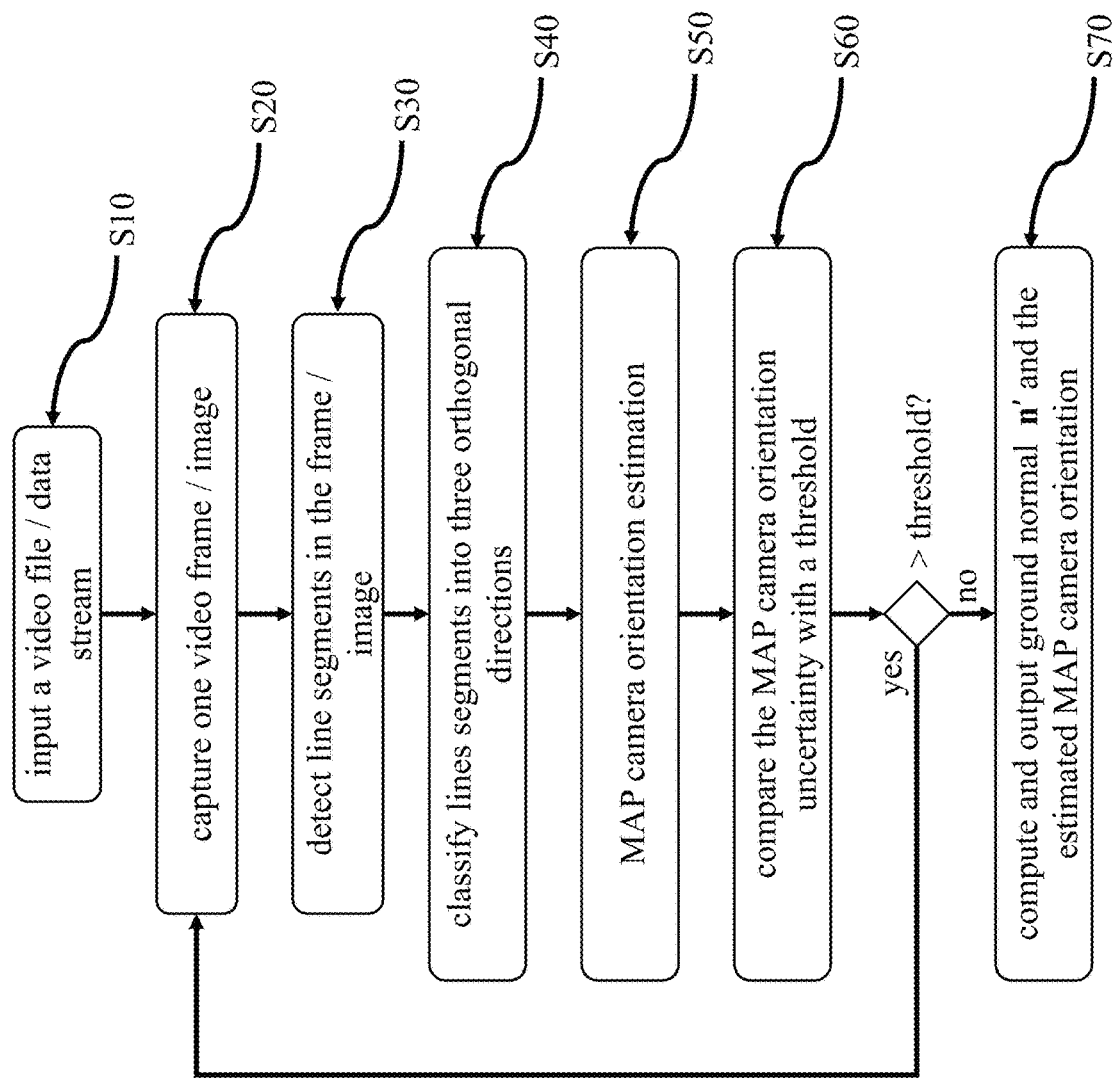
FIG. 4 depicts a flowchart of a method for estimating camera orientation according to various embodiments of the present invention.

Referring to the flowchart depicted in FIG. 4, a method for estimating camera orientation with high accuracy is provided in accordance to one embodiment of the present invention. The method includes steps S10-S60, which may be adopted by the machine vision application implemented by specific configurations of the AGV 100 and/or the remote processing server 150 as shown in FIG. 1.

In the step S10, a video file/data stream is produced by the AGV 100's front-facing camera 120 in capturing a real-world scene before it and transmitted to the remote processing server 150 via the wireless communication. The video file/data stream contains a plurality of video frames of continuous images.

In the step S20, a current video frame/image is extracted from the video file/data stream by the remote processing server 150. The video frame/image is static and reflects the real-world scene (i.e. the left image in FIG. 2 or FIG. 3).

In the step S30, detection of line segments in the current video frame/image is performed by the remote processing server 150, such that line segments are generated on the video frame/image (i.e. the right image in FIG. 2 or FIG. 3). In one embodiment, the generation of the line segments applies Canny edge detection and statistical Hough transform. More specifically, the video frame/image in RGB setting is converted into a 2D array containing only zeros and ones using Canny edge detection. Thereafter, line segments are detected from the 2D array by using statistical Hough transform, so as to obtain the locations where the line segments are on the video frame/image. The afore-described detection of line segments is only one exemplary embodiment, an ordinarily skilled person in the art may readily adopt any other technique of line detection existing in the art.

In step S40, the line segments detected in the step S30 are classified and grouped into three orthogonal directions, for example, the X, Y and Z directions. In one embodiment, the classification and grouping of the line segments comprises superimposing on to the current video frame/image a virtual cube having three orthogonal vanishing points in a random or best-guess 3D orientation. An orthogonal direction classifier classifies the line segments of the video frame/image and groups them by comparing the perpendicular distances between each of the three orthogonal vanishing points of the first virtual cube to each of the detected line segments, and determining the group of which the line segment belongs to according to the shortest of the three perpendicular distances. The details of this embodiment of classification and grouping of the line segments are provided in U.S. patent application Ser. No. 16/992,088.

In another embodiment, the classification and grouping of the line segments comprises projecting the 3D x-axis, y-axis, and z-axis infinity points corresponding to an initial orientation of the camera on to the first image to obtain the respective three 2D orthogonal vanishing points in the X, Y, and Z directions. The initial orientation of the camera may be obtained from the camera's calibrated (or intrinsic) matrix, a best guess orientation, or a random orientation.

Then, an orthogonal direction classifier classifies the line segments of the first image and groups them into a frontal line segment group, which contains line segments having the shortest perpendicular distances to the X vanishing point in comparison to the other vanishing points; a lateral line segment group, which contains line segments having the shortest perpendicular distances to the Y vanishing point in comparison to the other vanishing points; and a vertical line segment group, which contains line segments having the shortest perpendicular distances to the Z vanishing point in comparison to the other vanishing points.

In step S50, a maximum a-posteriori (MAP) camera orientation estimation is performed to obtain a MAP camera orientation by considering a priori camera orientation with its corresponding priori camera orientation uncertainty and a maximum likelihood (ML) camera orientation with its corresponding ML camera orientation uncertainty; wherein the ML camera orientation is computed by taking the camera's calibrated matrix and maximizing a likelihood objective by rotating the camera's 3D X-Y-Z coordinate system such that it is being optimally aligned with the 2D line segments in at least two of the three orthogonal directions.

The MAP camera orientation estimation then maximizes an a-posteriori objective such that the MAP camera orientation is computed to equal to an optimal value, which being a value in between the ML camera orientation and the priori camera orientation, and being closer to the one with the smaller uncertainty.

In step S60, compare the MAP camera orientation uncertainty with a MAP camera orientation uncertainty threshold value; and if the MAP camera orientation uncertainty is higher than the threshold value, the process steps S20 to S50 are repeated with a subsequent video frame/image of the video file/data stream with the priori camera orientation and its corresponding priori camera orientation uncertainty set to the computed MAP camera orientation and its corresponding MAP camera orientation uncertainty respectively. As to the priori camera orientation and its corresponding priori camera orientation uncertainty used in the MAP camera orientation estimation on the first image, a best guess or random camera orientation and its corresponding camera orientation uncertainty are used.

The iterations of the process steps S20 to S50 continue with each subsequent video frame/image of the video file/data stream for computing an estimated MAP camera orientation and its corresponding MAP camera orientation uncertainty in each iteration until the MAP camera orientation uncertainty is found to be equal or below a pre-defined MAP camera orientation uncertainty threshold.

Finally, in step S70, the MAP camera orientation that is corresponding to the MAP camera orientation uncertainty found to be equal or below a pre-defined MAP camera orientation uncertainty threshold is taken as the camera orientation estimation result. Also, a ground plane normal vector, n, of the scene before the camera is computed by solving:

$n = R^*[0, 0, 1]^T$; where $R^*$ is the resulting estimated camera orientation rotation matrix.

Figure 5A:
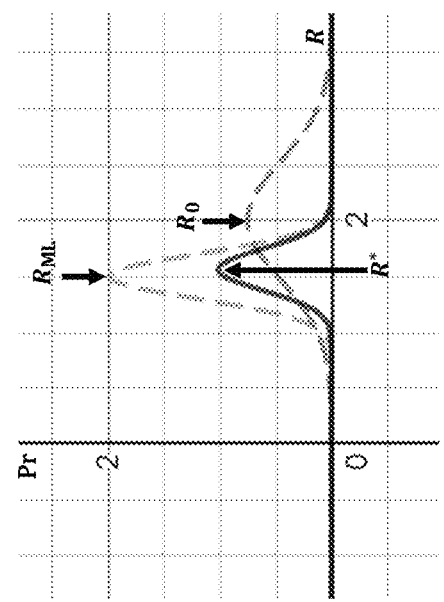
FIGS. 5A and 5B shows an exemplary "likelihood" and "prior" Gaussian probability density functions and an "a-posteriori" product function in illustrating the Bayes' theorem used in a maximum a-posteriori method for estimating camera orientation according to an embodiment of the present invention.
Figure 5B:
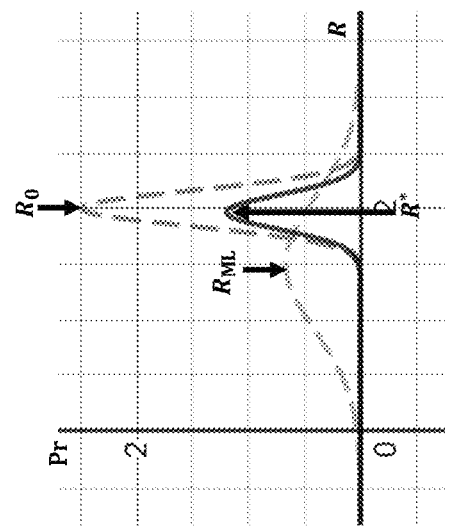

In accordance to one embodiment, the MAP camera orientation estimation is based on the Bayes' theorem that combines a priori camera orientation (the camera orientation estimation result in the last estimation iteration), $R_0$, and the ML camera orientation, $R_{ML}$, of the current video frame or image in finding an optimal camera orientation, R, by maximizing an a-posteriori probability, which can be expressed by:

$Pr(R) = Pr(\text{current frame or image}|R) \times Pr(R|\text{previous frame or image})$;

where R is the camera orientation being estimated;

Pr(current frame or image|R) is the "likelihood" term, which is a Gaussian probability density function that attains its maximum value at $R=R_{ML}$, with its co-variance being the ML camera orientation uncertainty of the current video frame or image;

Pr(R|previous frame or image) is the "prior" term, which is a Gaussian probability density function that attains its maximum value at $R=R_0$, with its co-variance being the priori camera orientation uncertainty; and Pr(R) is the "a-posteriori" term, which is a product of the two Gaussian probability density functions and thus is proportional to a Gaussian probability density function with its maximum value ($R=R^*$) lying in between $R_{ML}$ and $R_0$ depending on the co-variances of the Gaussian probability density functions (the ML camera orientation uncertainty and the priori camera orientation uncertainty). To further illustrate, FIG. 5A shows the functions of the "likelihood", "prior", and "a-posteriori" terms with "prior" having larger uncertainty, hence $R^*$ is closer to $R_{ML}$; and FIG. 5B shows the functions of the "likelihood", "prior", and "a-posteriori" terms with "likelihood" having larger uncertainty, hence $R^*$ is closer to $R_0$. The optimal camera orientation, $R^*$, found is then the MAP camera orientation estimated in the current iteration and its corresponding uncertainty being the co-variance of Pr(R).

Figure 6:
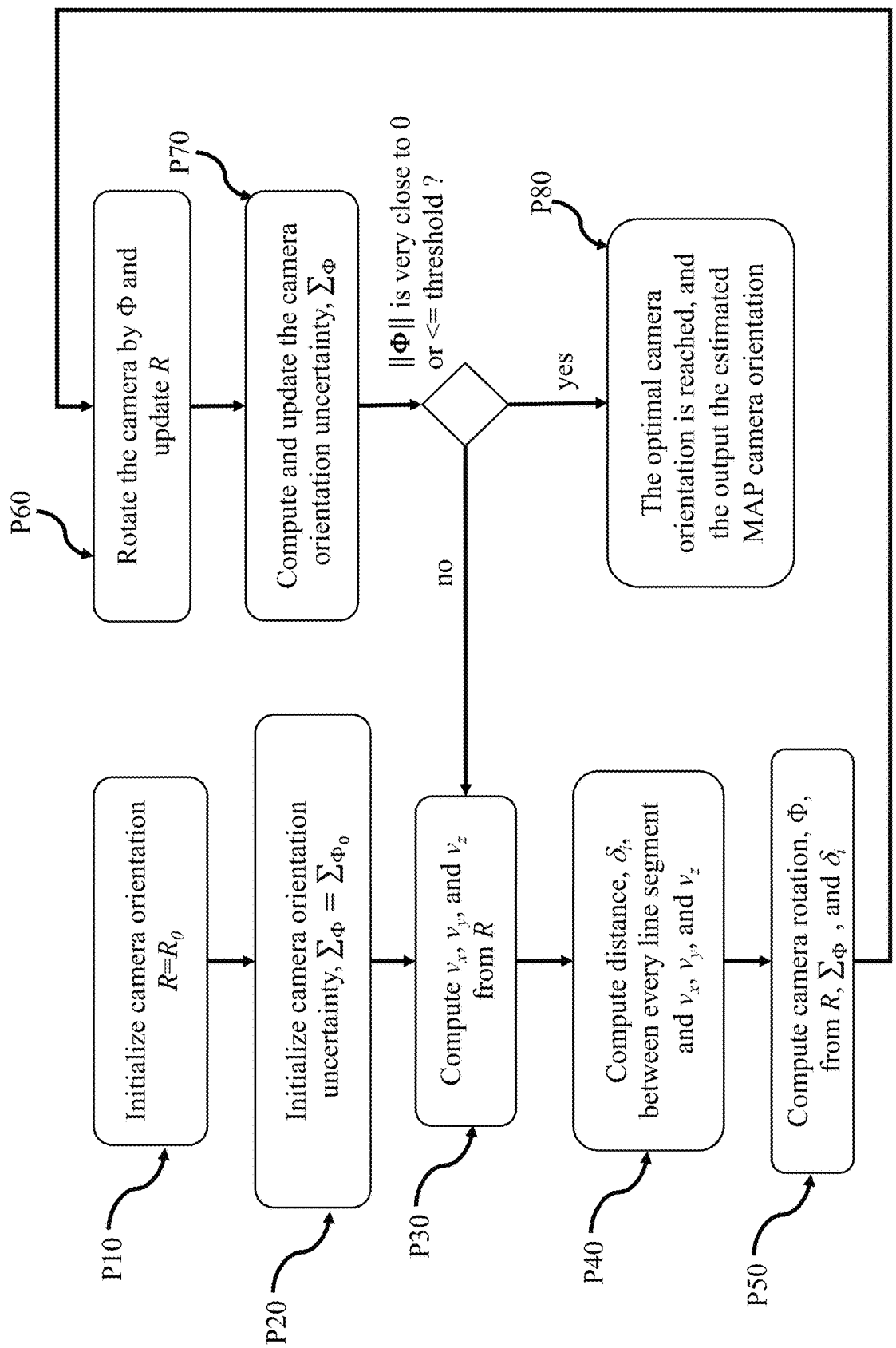
FIG. 6 depicts a flowchart of the maximum a-posteriori method in the camera orientation estimation.

Referring to the flowchart depicted in FIG. 6, a method of the MAP camera orientation estimation is provided in accordance to one embodiment of the present invention. The method includes steps P10-P60, which may be adopted by the machine vision application implemented by specific configurations of the AGV 100 and/or the remote processing server 150 as shown in FIG. 1.

In step P10, the rotation matrix of the camera orientation being estimated, R, is first initialized to equal to that of the priori camera orientation (the camera orientation estimation result in the last camera orientation estimation on the last video frame/image), $R_0$; that is: $R=R_0$, where each of R and $R_0$ is a 3×3 rotation matrix. Note that the camera orientation can also be expressed in Euler-angle representation, which is a vector of three elements, denoted as $\Phi$.

In step P20, the camera orientation uncertainty, which can be expressed by the co-variance matrix, $\Sigma_\Phi$, is initialized to equal to the priori camera orientation uncertainty, which can be expressed by the co-variance matrix, $\Sigma_{\Phi_0}$; where $\Phi_0$ is an infinitesimal Euler-angle defined with respect to $R_0$ perturbing to R.

In step P30, compute the orthogonal vanishing points, $v_x$, $v_y$, and $v_z$ in the X, Y, and Z directions respectively of a X-Y-Z coordinate system under the camera orientation obtained from the camera orientation rotation matrix, R.

Figure 7:
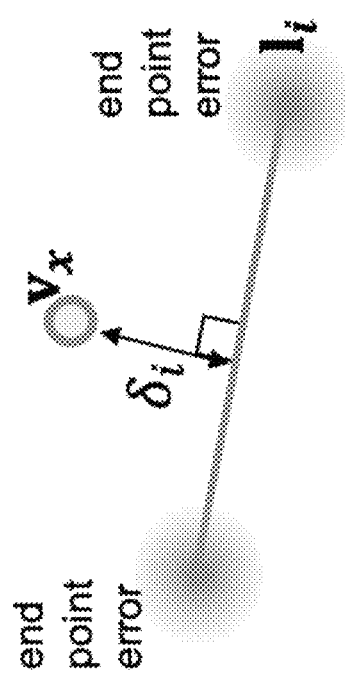
FIG. 7 illustrates the computation of a perpendicular distance between an orthogonal vanishing point and a line segment according to various embodiments of the present invention.

In step P40, project the orthogonal vanishing points, $v_x$, $v_y$, and $v_z$ on to the current video frame/image; measuring the perpendicular distance, $\delta_x$, from every line, $l_x$, in the frontal line segment group to $v_x$; measuring the perpendicular distance, $\delta_y$, from every line, $l_y$, in the lateral line segment group to $v_y$; and measuring the perpendicular distance, $\delta_z$, from every line, $l_z$, in the vertical line segment group to $v_z$. FIG. 7 illustrates the aforesaid measurements. After the measurements are completed, the obtained $\delta_x$, $\delta_y$, and $\delta_z$, can be defined in terms of the camera orientation rotation matrix, R, as:

$$\delta_{x_i} = \frac{l_{x_i}^T KR[1, 0, 0]^T}{\text{error of } l_{x_i}},$$

$$\delta_{y_i} = \frac{l_{y_i}^T KR[0, 1, 0]^T}{\text{error of } l_{x_i}},$$

$$\delta_{z_i} = \frac{l_{z_i}^T KR[0, 0, 1]^T}{\text{error of } l_{z_i}};$$

and it is further defined: $\delta_i \in \{\delta_{xi}, \delta_{yi}, \delta_{zi}\}$, $l_i \in \{l_{xi}, l_{yi}, l_{zi}\}$, and K being the camera's calibrated matrix.

To find the optimal camera orientation, R*, that maximizes the "a-posteriori" term: $Pr(\Phi|\Sigma\delta_i)$, the $\Phi_{ML}$ that maximizes the "likelihood" term: $Pr(\Sigma\delta_i|\Phi)$ is first computed by linearizing the total error term, $\Sigma\delta_i$, at the current camera orientation over $\Phi$. It can also be expressed by that the maximum of the "likelihood" term is found by solving $\Phi$ for $\partial J(\Phi)/\partial\Phi=0$; where $\partial J(\Phi)/\partial\Phi$ is the linear rate of change of total error, $E(\Phi)=\Sigma\delta_i$, with respect to the camera orientation around the vicinity of the current $\Phi$. The uncertainty in $\Phi_{ML}$ represented by the co-variance matrix, $\Sigma_{\Phi_{ML}}$, can be computed from the pixel noise, $\Sigma_g$, using propagation of uncertainty principle, where $\Sigma_g$ is a user-defined co-variance matrix of the pixel noise at both ends of the line segment. Then using $\Phi_{ML}$, $\Sigma_{\Phi_{ML}}$, the priori $\Phi_0$, and the uncertainty in the prior $\Sigma_{\Phi_0}$, the $\Delta\Phi_{MAP}$ that maximizes the "a-posteriori" term can be computed using the Bayes' Theorem for Gaussians. The Theorem also computes the uncertainty in $\Delta\Phi_{MAP}$ represented by the co-variances matrix $\Sigma_{\Phi_{MAP}}$. Next, the current camera orientation is rotated by the amount expressed in $\Delta\Phi_{MAP}$ and obtain a new camera orientation matrix, R. This new R may or may not be the true value that maximizes the "a-posteriori" term because of the approximation error introduced during linearization. As such, the process repeats again starting from the linearization of $\Sigma\delta_i$ but instead doing so at the vicinity around the new R. With enough iterations, R approaches the true value that maximizes "a-posteriori" term and the amount expressed in $\Delta\Phi_{MAP}$ gets closer and closer to zero. Lastly, optimal camera orientation, R*=R, and the uncertainty in the camera orientation R* is the $\Sigma_{\Phi_{MAP}}$ computed from the last iteration.

In step P50, compute the amount of rotation, $\Delta\Phi_{MAP}$, from R, $\Phi_0$, $\Sigma_{\Phi_0}$, and $\delta_i$ such that the current camera orientation, R, should be rotated by $\Delta\Phi_{MAP}$ for attaining R*, which can be expressed by: wherein the computation of camera rotation, $\Delta\Phi_{MAP}$, comprises the following sub-steps:

Sub-step I: compute $\Phi_0$ from $R_0$ by solving $[\Phi_0]_x = \ln R_0$; and compute the precision of the priori camera orientation by pseudo inversing of the priori camera orientation uncertainty, $\Sigma_{\Phi_0}$, which can be expressed by: $\Lambda_{\Phi_0} = \Sigma_{\Phi_0}^+$;

Sub-step II: compute $\Phi_{ML}$ such that the rate of change of $E(\Phi) = \Sigma_i \epsilon_i^2 / J_i \Sigma_g J_i^T$ is 0, i.e., $\partial J(\Phi)/\partial\Phi=0$, where $\epsilon_i = l_i^T KRP_i$, by solving the following intermediate expressions, during which $\Sigma_{\Phi_{ML}}$ is also computed:

$$H_i^T = [P_i]_x R_0 K^T l_i;$$

$$\frac{\partial l_i}{\partial g} = \begin{bmatrix} 0 & 1 & 0 & 1 \\ -1 & 0 & 1 & 0 \\ q & -p & -v & u \end{bmatrix};$$

$$J_i = P_i^T R^T K^T \frac{\partial l_i}{\partial g};$$

$$w_i = J_i \sum_g J_i^T;$$

$$A = \sum_i H_i^T w_i H_i;$$

$$b = \sum_i H_i^T w_i \epsilon_i;$$

$$E_{\Phi_{ML}} = A^+; \Phi_{ML} = \Sigma_{\Phi_{ML}} b;$$

Sub-step III: compute the camera rotation, $\Delta\Phi_{MAP}$, so to maximize "a-posteriori" between $\Phi_{ML}$ and $\Phi_0$ by solving the following intermediate expressions, during which $\Sigma_{\Delta\Phi_{MAP}}$ is also computed:

$$C = A + \Lambda_{\Phi_0}; d = b + \Lambda_{\Phi_0}(\Phi_{ML} - \Phi_0);$$

$$\Sigma_{\Delta\Phi_{MAP}} = C^+; \Delta\Phi_{MAP} = \Sigma_{\Delta\Phi_{MAP}} d;$$

where:

$l_i$ represents the line segment i, that is $l_i = (p_i, q_i, 1) \times (u_i, v_i, 1)$ between two end points $(p_i, q_i)$ and $(u_i, v_i)$;

$$P_i = \begin{cases} [0, 0, 1]^T \text{ for } l_i \text{ in the vertical line segment group} \\ [0, 1, 0]^T \text{ for } l_i \text{ in the lateral line segment group}; \\ [1, 0, 0]^T \text{ for } l_i \text{ in the frontal line segment group} \end{cases}$$

K is the camera's calibrated matrix; and $\Sigma_g$ is a user-defined pixel noise co-variance at both ends of the line segment, $l_i$.

In step P60, rotate the camera orientation X-Y-Z coordinate system by $\Delta\Phi_{MAP}$, that is the current camera orientation rotation matrix, R, is perturbed by $\Delta\Phi_{MAP}$, or updated by $R_{\Delta\Phi_{MAP}} R$, which can be expressed by:

$$R \leftarrow R_{\Delta\Phi_{MAP}} R; R_{\Delta\Phi_{MAP}} = R_0 e^{[\Delta\Phi_{MAP}]_x} R_0^T.$$

In step P70, update the camera orientation uncertainty by the co-variance of $\Delta\Phi_{MAP}$, which is $\Sigma_\Phi = \Sigma_{\Delta\Phi_{MAP}}$.

If $\|\Delta\Phi_{MAP}\|$ is very close to 0 or lower than a pre-defined camera rotation threshold, proceeds to step P80; otherwise, repeats steps P30 to P70.

In step P80, the optimal camera orientation, R*, is found to be the current camera orientation, that is R*←R, and the estimated MAP camera orientation is the optimal camera orientation.

Although the above description of the present invention involved only ground-based AGVs, an ordinarily skilled person in the art can readily adapt and apply the various embodiments of the present invention in other machine vision applications in e.g. aerial and marine-based drones without undue experimentation or deviation from the spirit of the present invention.

The electronic embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the electronic embodiments may be executed in one or more computing devices including server computers, personal computers, laptop computers, mobile computing devices such as smartphones and tablet computers.

The electronic embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Various embodiments of the present invention also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method for estimating camera orientation of a camera relative to a ground, comprising:
    initializing a priori camera orientation and its corresponding priori camera orientation uncertainty with a best guess or random camera orientation of the camera;
    executing an iterative multi-image camera orientation estimation, comprising:
        capturing a new image or extracting a new video frame from a video of a scene before the camera;
        detecting one or more line segments in the scene in the image or video frame;
        classifying and grouping the line segments of the image or video frame into a frontal, a lateral, and a vertical line segment groups;
        computing a maximum likelihood (ML) camera orientation by taking a calibrated matrix of the camera and maximizing a likelihood objective by rotating a X-Y-Z coordinate system under the camera orientation such that it is being optimally aligned with the line segments in at least two of the frontal, the lateral, and the vertical orthogonal directions;
        estimating a maximum a-posteriori (MAP) camera orientation that maximizes an a-posteriori objective such that the MAP camera orientation is an optimal value in between the priori camera orientation and the ML camera orientation, and is closer to the one with smaller uncertainty;
        comparing the MAP camera orientation with a predefined MAP camera orientation uncertainty; and
        if the MAP camera orientation uncertainty is higher than the MAP camera orientation uncertainty threshold, iterating the multi-image camera orientation estimation with the priori camera orientation and its corresponding priori camera orientation uncertainty set to the computed MAP camera orientation and its corresponding MAP camera orientation uncertainty respectively; and
    if the MAP camera orientation uncertainty is equal and lower than the MAP camera orientation uncertainty threshold, taking the MAP camera orientation that is corresponding to the MAP camera orientation uncertainty that is equal and lower than the MAP camera orientation uncertainty threshold value as the camera orientation estimation method result.

2. The method of claim 1, wherein the classification and grouping of the line segments of the image or video frame into the frontal, the lateral, and the vertical line segment groups comprises:
    projecting a three-dimensional (3D) x-axis infinity point, a 3D y-axis infinity point, and a 3D z-axis infinity point infinity points corresponding to an initial orientation of the camera on to the image or video frame to obtain a two-dimensional (2D) X-directional orthogonal vanishing point, a 2D Y-directional orthogonal vanishing point, and a 2D Z-directional orthogonal vanishing point respectively of the scene in the image or video frame; and
    classifying and grouping the line segments into a frontal line segment group, which contains line segments having shortest perpendicular distances to the X-directional orthogonal vanishing point in comparison to the other vanishing points; a lateral line segment group, which contains line segments having shortest perpendicular distances to the Y-directional orthogonal vanishing point in comparison to the other vanishing points, and a vertical line segment group, which contains line segments having the shortest perpendicular distances to the Z-directional orthogonal vanishing point in comparison to the other vanishing points;
    wherein the initial orientation of the camera is obtained from the camera's calibrated matrix, a best guess orientation, a randomly set orientation, or measurements using an orientation sensor.

3. The method of claim 1, wherein the MAP camera orientation estimation comprises:
    initializing a currently estimated camera orientation rotation matrix to a prior camera orientation rotation matrix of the prior camera orientation;
    initializing a currently estimated camera orientation uncertainty to a prior camera orientation uncertainty of the prior camera orientation;
    executing an iterative a-posteriori objective maximization comprising:
        computing a X-directional orthogonal vanishing point, a Y-directional orthogonal vanishing point, and a Z-directional orthogonal vanishing point of a X-Y-Z coordinate system under the currently estimated camera orientation;
        projecting the X-directional orthogonal vanishing point, the Y-directional orthogonal vanishing point, and the Z-directional orthogonal vanishing point on to the image or video frame;
        measuring a perpendicular distance between each line segment in the frontal line segment group and the X-directional orthogonal vanishing point, a perpendicular distance between each line segment in the lateral line segment group and the Y-directional orthogonal vanishing point, and a perpendicular distance between each line segment in the vertical line segment group and the Z-directional orthogonal vanishing point;

computing a camera rotation Euler-angle for rotating from the currently estimated camera orientation rotation matrix, currently estimated camera orientation uncertainty, and the perpendicular distances so to maximize the a-posteriori objective;

updating the currently estimated camera orientation rotation matrix by perturbing it by the camera rotation Euler-angle;

updating currently estimated camera orientation uncertainty by setting it to a co-variance of the camera rotation Euler-angle; and if the camera rotation Euler-angle is higher than a pre-defined camera rotation threshold, iterating the a-posteriori objective maximization;

if the camera rotation Euler-angle equal or lower than the camera rotation threshold, outputting the currently estimated camera orientation as the MAP camera orientation, and the currently estimated camera orientation uncertainty as the MAP camera orientation uncertainty.

4. The method of claim 3, wherein the computation of the camera rotation Euler-angle, comprises:

computing $\Phi_0$ from $R_0$ by solving $[\Phi_0]_x = \ln R_0$;

computing a precision of the priori camera orientation, $\Lambda_{\Phi_0}$, by pseudo inversing of the priori camera orientation uncertainty, $\Sigma_{\Phi_0}$, that is $\Lambda_{\Phi_0} = \Sigma_{\Phi_0}^+$;

computing $\Phi$ such that a rate of change of $E(\Phi) = \Sigma_i \in_i^2 / J_i \Sigma_g J_i^T$ is 0, where $\in_i = l_i^T K R P_i$, by solving $\Phi_{ML} = \Sigma_{\Phi_{ML}} b$, where:

$$H_i^T = [P_i]_\times R_0 K^T l_i;$$

$$\frac{\partial l_i}{\partial g} = \begin{bmatrix} 0 & 1 & 0 & 1 \\ -1 & 0 & 1 & 0 \\ q & -p & -v & u \end{bmatrix};$$

$$J_i = P_i^T R^T K^T \frac{\partial l_i}{\partial g};$$

$$w_i = J_i \Sigma_g J_i^T;$$

$$A = \Sigma_i H_i^T w_i H_i;$$

$$\Sigma_{\Phi_{ML}} = A^+;$$

$$b = \Sigma_i H_i^T w_i \in_i; \text{ and}$$

computing the camera rotation Euler-angle, $\Delta\Phi_{MAP}$, by solving $\Delta\Phi_{MAP} = \Sigma_{\Delta\Phi_{MAP}} d$, where:

$$C = A + \Lambda_{\Phi_0};$$

$$d = b + \Lambda_{\Phi_0}(\Phi_{ML} - \Phi_0);$$

$$\Sigma_{\Delta\Phi_{MAP}} = C^+;$$

$l_i$ represents the line segment i, that is $l_i = (p_i, q_i, 1) \times (u_i, v_i, 1)$ between two end points $(p_i, q_i)$ and $(u_i, v_i)$;

$$P_i = \begin{cases} [0, 0, 1]^T & \text{for } l_i \text{ in the vertical line segment group} \\ [0, 1, 0]^T & \text{for } l_i \text{ in the lateral line segment group} \\ [1, 0, 0]^T & \text{for } l_i \text{ in the frontal line segment group} \end{cases};$$

K is the camera's calibrated matrix; and $\Sigma_g$ is a user-defined pixel noise co-variance at both ends of the line segment, $l_i$.

5. The method of claim 1, further comprising a ground plane normal vector, n, of the scene before the camera is computed by solving:

n=R*[0, 0, 1]$^T$; where R* is a rotation matrix of the camera orientation estimation method result.

6. The method of claim 1, wherein the detection of one or more line segments in the scene in the image or video frame comprises:

converting the image or video frame into a 2D array containing only zeros and ones using Canny edge detection; and detecting the line segments from the 2D array using statistical Hough transform.

7. A method for guiding a vehicle or a mobile robot having a front-facing camera, comprising:

executing a method for estimating camera orientation of the front-facing camera of claim 1; and controlling motions of the vehicle by a remote processing server in response to the estimated camera orientation.

8. A remote processing server for estimating camera orientation of a front-facing camera of an autonomous guided vehicle (AGV) or a mobile robot, comprising:

a processor in data communication with an AGV or a mobile robot;

wherein the processor is configured to receive a video file or data stream from the AGV or the mobile robot and to execute the method for estimating camera orientation of claim 1 with respect to the front-facing camera of the AGV or the mobile robot.

9. An autonomous guided vehicle (AGV), comprising:

a front-facing camera installed at a front side of the AGV body and configured to capture a scene before the AGV;

a processor configured to receive a video file or data stream from the front-facing camera and to execute the method for estimating camera orientation of claim 1 with respect to the front-facing camera of the AGV.

10. A mobile robot, comprising:

a front-facing camera installed at a front side of the mobile robot body and configured to capture a scene before the mobile robot;

a processor configured to receive a video file or data stream from the front-facing camera and to execute the method for estimating camera orientation of claim 1 with respect to the front-facing camera of the mobile robot.

* * * * *